3,775,436

COLOR STABILIZATION OF MALEIC ANHYDRIDE

Raymond E. Stenseth, St. Louis, Mo., assignor to Monsanto Company, St. Louis, Mo.
No Drawing. Filed Aug. 9, 1971, Ser. No. 170,352
Int. Cl. C07c 57/14
U.S. Cl. 260—346.8    15 Claims

ABSTRACT OF THE DISCLOSURE

Dicarboxylic acid anhydrides such as maleic anhydride are provided with improved color stability by a treating agent represented by the structure $$R_m\text{—}Z\text{—}X_n$$

where R is alkyl of from 1 to 8 carbon atoms or phenyl, Z is selected from the group consisting of aluminum, germanium, lead, mercury, phosphorus, selenium, silicon, tin, titanium and zirconium, X is a halogen, $m$ is an integer of from 1 to 4 and $n$ is an integer of from 1 to 3.

---

This invention relates to the color stabilization of dicarboxylic acid anhydrides. More particularly, it relates to the color stabilization of maleic anhydride.

Anhydrides of certain dicarboxylic acids are available to the consumer in either solid or molten form. Although these anhydrides are classified as chemically stable compounds, discoloration of the material is frequently encountered, particularly after exposure to elevated temperatures. This discoloration is especially pronounced when the anhydrides are maintained in their molten form for extended periods.

The color of maleic anhydride, for example, may darken with time under normal storage conditions. Maleic anhydride is often transported in molten form in heated, insulated tank cars and is maintained in this state for long periods of time. Furthermore, under more elevated temperatures such as those encountered during processing of maleic anhydride in commercial applications, the molten maleic anhydride will frequently darken.

Maleic anhydride can be prepared by the vapor-phase oxidation of organic compounds such as benzene, toluene, naphthalene, methyl naphthalene, phenol, cresol, benzophenone, furan, biphenyl, furfural, n-butane, 1-butene, 2-butene, butadiene, heptane, iso-octane, crotonaldehyde and crotonic acid, employing a large excess of air. By-products of the above reaction include other organic acids, chromogenic bodies, carbon monoxide, carbon dioxide and water. Crude maleic anhydride is generally very dark in color, and this is particularly true of maleic anhydride produced by way of the vapor-phase oxidation process. Although the crude maleic anhydride may be refined to a substantially colorfree material, color often reappears upon storage and/or processing as hereinabove described. Color is an undesirable characteristic of maleic anhydride and, if present before or during processing in commercial applications, can cause deleterious effects in resulting products such as plastics, where proper color is an important feature of the material.

The prior art discloses various methods for improving the color stability of dicarboxylic acid anhydrides. One such method is disclosed in U.S. Pat. No. 3,115,477 wherein maleic anhydride compositions having improved color stability are prepared by (1) treating crude maleic anhydride with from 0.1 to 10 percent of phosphorus pentoxide at a temperature of about 140° C. to 200° C., (2) distilling maleic anhydride therefrom and (3) adding color stabilizing amounts of thiodipropionic acid or esters thereof to the distilled maleic anhydride. Another method for improving color stability is disclosed in U.S. Pat. No. 3,115,503 wherein color stabilizing amounts of ethylenediaminetetraacetic acid are added to a molten cyclic anhydride during the preparation process or thereafter. Alternatively, the acid is added to the finely divided solid cyclic anhydride prior to compressing into tablets or briquettes.

Still another prior art disclosure (U.S. Pat. No. 3,564,022) teaches the color stabilization of maleic anhydride by the steps of: (1) treating a crude maleic anhydride at elevated temperatures with a small amount of a heat stable acidic compound, (2) distilling the resulting mass to recover refined maleic anhydride, and (3) adding to the refined maleic anhydride a small amount of a hydrocarbon sulfide, e.g., dibenzyl sulfide.

Notwithstanding the known prior art efforts toward improving the color stability of dicarboxylic acid anhydrides, there remains a need for superior treating agents. It is an object of the present invention, therefore, to provide color stabilized dicarboxylic acid anhydrides. Another object of the present invention is to provide a color stabilized composition comprising a dicarboxylic acid anhydride and a color stabilizing amount of a treating agent. Still another object of the present invention is to significantly retard discoloration of dicarboxylic acid anhydrides, particularly those which are exposed to elevated temperatures. Yet another object of the present invention is to provide a process for color stabilization of refined dicarboxylic acid anhydrides, such as maleic anhydride, by the introduction of a treating agent selected from a particular group of compounds. Other objects and advantages of the present invention will become apparent from a consideration of the accompanying disclosure and the appended claims.

In accordance with this invention it has been discovered that a remarkable improvement in color stability of refined dicarboxylic acid anhydrides can be achieved by the introduction thereto of a color stabilizing amount of a treating agent represented by the structure $$R_m\text{—}Z\text{—}X_n$$

where R is alkyl of from 1 to 8 carbon atoms or phenyl, Z is selected from the group consisting of aluminum, germanium, lead, mercury, phosphorus, selenium, silicon, tin, titanium and zirconium, X is a halogen, $m$ is an integer of from 1 to 4 and $n$ is an integer of from 1 to 3.

Color stabilized compositions obtained through use of the treating agents of this invention exhibit superior color properties as will be demonstrated by test results hereinafter presented. The color stabilized compositions of the present invention may contain a mixture of two or more different treating agents within the aforedescribed structure.

The halogen-containing treating agents of the present invention are preferably employed with dicarboxylic acid anhydrides in the refined state such as commercially pure maleic anhydride. This simplifies the method of introducing the treating agent in contrast to certain prior art methods wherein the color stabilizer must be added to the crude anhydride during manufacture, e.g., before distillation. The prior art methods of introducing a color stabilizer during manufacture generally result in the polymerization or carbonization of impurities, thus making them separable by distillation. The present invention is distinguished therefrom in that no distillation after treatment is necessary in the method described herein.

While most of the treating agents of the present invention are organometallic compounds in the commonly understood sense, several of the elements represented by Z in the above structure have non-metallic properties. Silicon and germanium are examples of such elements. Silicon is usually considered non-metallic although it possesses some metallic properties. Germanium, however, is more metallic than non-metallic.

From the electrical standpoint, silicon and germanium are not metals, but rather semiconductors that increase in resistance with falling temperatures. From the chemical standpoint, however, they are metals or metalloids because they are more electropositive than carbon and lie in the metallic half of Pauling's scale of electronegativity. Structurally silicon and germanium have the diamond lattice and are thus characteristic of a metalloid whereas their compounds with alkyl and aryl groups are decidedly organometallic. Tin and lead, however, are true metals in the electrical, mechanical, optical and chemical sense, yet their organometallic compounds show no sharp distinction over those of silicon and germanium.

It has been discovered that the color of dicarboxylic anhydrides can be stabilized against deterioration due to heat and storage by treatment with halogen-containing compounds of aluminum, germanium, lead, mercury, phosphorus, selenium, silicon, tin, titanium and zirconium, wherein an organic radical is also present in the molecule. The halogens useful herein are chlorine, fluorine, bromine and iodine.

Although not to be construed in a limiting sense, the following compounds are exemplary of organoaluminum halides within the scope of the present invention: diethylaluminum chloride, diisobutylaluminum chloride, ethylaluminum dichloride, ethylaluminum sesquichloride, isobutylaluminum dichloride, methylaluminum sesquichloride.

Specific non-limiting examples of organogermanium halides useful as treating agents for dicarboxylic acid anhydrides are dibutylgermanium dichloride, diethylgermanium dichloride, dimethylgermanium dichloride, diphenylgermanium dichloride, ethylgermanium trichloride, tributylgermanium chloride, tributylgermanium iodide, triethylgermanium chloride, triethylgermanium iodide, trimethylgermanium bromide, trimethylgermanium chloride, triphenylgermanium bromide, triphenylgermanium chloride, methylgermanium trichloride.

Specific non-limiting examples of organolead halides within the present invention are diethyllead dichloride, diphenyllead dichloride, triethyllead chloride, triphenyllead chloride.

Specific non-limiting examples of organomercury halides useful as treating agents for dicarboxylic acid anhydrides are ethylmercuric chloride, methylmercuric chloride, methylmercuric bromide, phenylmercuric bromide, phenylmercuric chloride.

Specific non-limiting examples of organophosphorus halides within the present invention are tetraphenylphosphonium chloride, diphenylphosphine chloride, phenylphosphine dichloride, phenylphosphine dibromide, tetrabutylphosphonium bromide, tetrabutylphosphonium chloride, tetraphenylphosphonium bromide, triphenylphosphonium bromide.

Specific non-limiting examples of organoselenium halides useful as treating agents for dicarboxylic acid anhydrides are triphenylselenium chloride, diphenylselenium dichloride.

Specific non-limiting examples of halogen-containing organosilicon compounds within the scope of the present invention are chloromethyltrichlorosilane, diphenyldichlorosilane, methyldichlorosilane, methylvinyldichlorosilane, triphenylchlorosilane, ethyltrichlorosilane, triethylchlorosilane, vinyltrichlorosilane, methyltrichlorosilane, dimethyldichlorosilane, phenyltrichlorosilane, trimethylchlorosilane, butyltrichlorosilane, pentyltrichlorosilane.

Specific non-limiting examples of organotin halides useful as treating agents for dicarboxylic acid anhydrides are tri-n-propyltin chloride, triphenyltin chloride, trimethyltin chloride, trimethyltin bromide, triethyltin bromide, tricyclohexyltin bromide, tributyltin fluoride, tri-n-butyltin chloride, tributyltin bromide, tribenzyltin chloride, phenyltin trichloride, divinyltin dichloride, di-n-propyltin dichloride, diphenyltin difluoride, diphenyltin dichloride, dimethyltin dibromide, dimethyltin dichloride, dioctyltin dichloride, dimethyltin difluoride, diethyltin dibromide, diethyltin dichloride, dibutyltin dichloride, dibenzyltin dichloride, n-butyltin trichloride, butyltin tribromide, dibutyltin dibromide, methyltin trichloride.

The following examples illustrate the advantageous and unexpected results that are achieved through use of the treating agents of this invention. These examples are intended to be illustrative only and are not to be construed in a limiting sense.

Examples 1 through 21 below demonstrate the effectiveness of a variety of treating agents within the present scope in improving the heat stability of refined maleic anhydride.

EXAMPLES 1 THROUGH 21

Untreated samples from a given lot of commercially pure maleic anhydride were melted in a 25 mm. by 200 mm. test tube and the initial or "melt" colors were determined at sample temperatures from about 55° C. to about 70° C. by comparison with the APHA color standards. The standard used to indicate the quantity or intensity of color of products in solution form is known as the APHA standard color test. This test was developed by the American Public Health Association and the test results are expressed in terms of the Hazen Platinum Cobalt Scale. A description of this procedure (identified as ASTM Designation D2280) is found in the 1968 Book of ASTM Standards, Part 20, beginning at page 1025.

Temperatures of the untreated samples were then raised to 140° C. and APHA color values were determined after 2 hours and after 24 hours of exposure at 140° C. This elevated temperature is used to accelerate the tendency of maleic anhydride to discolor and the APHA test results are an indication of how the maleic anhydride can withstand the effects of processing temperatures for commercial applications.

The color values from a number of untreated samples from this same lot of maleic anhydride were averaged and are presented in Table I below where the treating agent is indicated as "None." After 2 hours at 140° C., the average APHA color of all untreated samples was 90. The average initial or "melt" color was 10, and the average 24-hour color was 500+° C.

Additional samples of maleic anhydride from the aforementioned lot were melted and treated with various treating agents within the scope of the present invention. APHA color determinations for each of the 21 treated samples were made in the manner described above. These APHA color determinations are presented in Table I below. The treating agents were added to the molten maleic anhydride at concentrations of parts per million as indicated in Table I. When the phrase "parts per million" is used herein, the "parts" are parts by weight based upon the weight of the dicarboxylic acid anhydride.

TABLE I

| Ex. No. | Treating agent | Added, p.p.m. | APHA melt color | APHA color at 140° C. 2 hrs. | APHA color at 140° C. 24 hrs. |
|---|---|---|---|---|---|
|  | None |  | 10 | 90 | +500 |
| 1 | Methyltrichlorosilane | 2 | 10 | 15 | 75 |
| 2 | do | 10 | 10 | 10 | 70 |
| 3 | do | 50 | 10 | 10 | 35 |
| 4 | Dimethyldichlorosilane | 50 | 10 | 10 | 30 |
| 5 | Trimethylchlorosilane | 50 | 10 | 10 | 45 |
| 6 | Phenyltrichlorosilane | 1 | 10 | 10 | 60 |
| 7 | do | 2 | 10 | 10 | 70 |
| 8 | do | 10 | 10 | 10 | 50 |
| 9 | do | 50 | 10 | 10 | 35 |
| 10 | do | 1,000 | 10 | 10 | 100 |
| 11 | Methylgermanium trichloride | 50 | 10 | 10 | 30 |
| 12 | Phenyltin trichloride | 50 | 10 | 30 | +500 |
| 13 | Methyltin trichloride | 10 | 10 | 10 | 70 |
| 14 | do | 50 | 10 | 10 | 30 |

TABLE I—Continued

| Ex. No. | Treating agent | Added, p.p.m. | APHA melt color | APHA color at 140° C. | |
|---|---|---|---|---|---|
| | | | | 2 hrs. | 24 hrs. |
| 15 | Dicyclopentadienyl zirconium dichloride.[1] | 50 | 10 | 30 | 100 |
| 16 | Diphenylselenium dichloride. | 11 | 10 | 50 | 100 |
| 17 | do | 50 | 10 | 100 | 150 |
| 18 | Cyclopentadienyltitanium trichloride.[1] | 4 | [2]100 | 60 | 60 |
| 19 | do.[1] | 10 | [2]200 | 125 | 80 |
| 20 | Phenylphosphine dichloride. | 10 | 10 | 25 | 100 |
| 21 | do | 50 | 10 | 80 | 400 |

[1] Haze or slight flocculation noted at end of 24 hour heat test.
[2] High melt color due to yellow color of treating agent crystals; see Example 26 in Table II hereafter.

The following Examples 22 through 26 illustrate the color stabilizing effects of compounds of the present invention when added to refined maleic anhydride from a different commercial source than that of Examples 1 through 21. APHA color determinations were made in the manner described in Examples 1 through 21 for the untreated and treated samples. Table II below presents the test results on this lot of maleic anhydride.

TABLE II

| Ex. No. | Treating agent | Added, p.p.m. | APHA melt color | APHA color at 140° C. | |
|---|---|---|---|---|---|
| | | | | 2 hrs. | 24 hrs. |
| | None | | 15 | 300 | +500 |
| 22 | Phenyltrichlorosilane | 50 | 15 | 25 | 70 |
| 23 | Methyltrichlorosilane | 50 | 15 | 20 | 70 |
| 24 | Phenyltin trichloride | 50 | 15 | 50 | +500 |
| 25 | Ethylmercuric chloride | 50 | 15 | 30 | 90 |
| 26 | Cyclopentadienyl titanium trichloride. | 1 | [1]15 | 25 | 70 |

[1] Melt color satisfactory because of low amount of treating agent; compare Examples 18 and 19 in Table I.

The following Examples 27 through 29 illustrate the color stabilizing effects of compounds of the present invention when added to refined maleic anhydride from a different lot than previously exemplified. APHA color determinations were made in the manner described in Examples 1 through 21 for the untreated and treated samples. Table III below presents the test results on this lot of maleic anhydride.

TABLE III

| Ex. No. | Treating agent | Added, p.p.m. | APHA melt color | APHA color at 140° C. | |
|---|---|---|---|---|---|
| | | | | 2 hrs. | 24 hrs. |
| | None | | 10 | 20 | +500 |
| 27 | Phenyltrichlorosilane | 50 | 10 | 10 | 45 |
| 28 | Methyltrichlorosilane | 38 | 10 | 10 | 50 |
| 29 | Diphenyllead dichloride. | 50 | 10 | 15 | 80 |

The following Examples 30 through 32 illustrate the color stabilizing effects of compounds of the present invention when added to still a different lot than previously exemplified. APHA color determinations were made in the manner described in Examples 1 through 21 for the untreated and treated samples. Table IV below presents the test results on this lot of maleic anhydride.

TABLE IV

| Ex. No. | Treating agent | Added, p.p.m. | APHA melt color | APHA color at 140° C. | |
|---|---|---|---|---|---|
| | | | | 2 hrs. | 24 hrs. |
| | None | | 10 | 30 | +500 |
| 30 | Triphenyllead chloride[1] | 50 | 10 | 20 | 100 |
| 31 | Tri-n-butyltin chloride | 50 | 10 | 10 | 80 |
| 32 | 50%-50% mixture of phenyltrichlorosilane and methyltrichlorosilane. | [2]25 | 10 | 10 | 40 |

[1] Slight haze observed at completion of 24 hour heat test.
[2] P.p.m. each.

Dicarboxylic acid anhydrides can be color stabilized by treatment with the treating agents of the present invention according to numerous procedures. In general, the treating agent may be added to the dicarboxylic acid anhydride by any of the known methods for mixing a small amount of one material with another material. For example, in the case of maleic anhydride, the treating agent may be added to a part of the maleic anhydride in order to prepare a solution which can then be conveniently introduced to the large mass of maleic anhydride to be treated. Alternatively, the treating agent may be added directly to the large mass of maleic anhydride. The temperature of the maleic anhydride at which the treating agent is added or the temperature of the large mass of maleic anhydride to which the prepared solution is added is not critical and can be maintained between the melting point and the boiling point of maleic anhydride as desired.

Successful results can be achieved by adding the treating agents of the present invention to molten refined maleic anhydride in the pipeline at the manufacturing site. Similar results can be achieved by introducing the treating agents to refined molten maleic anhydride in a hold tank, in a heated tank car, or in a melting kettle.

Considerable variation is afforded in the amount of treating agent which can be added to the dicarboxylic acid anhydride to impart color stability. In the case of maleic anhydride, it has been found that there is some variation in properties among different lots and sources of maleic anhydride. Furthermore, it has been found that some lots of maleic anhydride are more difficult to treat than others. Additionally, the amount of treating agent required will depend, to a certain extent, upon the temperature to which the maleic anhydride is to be exposed, and the duration of exposure at that temperature.

Accordingly, the amount of treating agent incorporated in the dicarboxylic acid anhydride can vary between about 0.01 parts per million and 20,000 parts per million, based upon the weight of the dicarboxylic acid anhydride. Desirably, the treating agent can comprise from about 0.05 to about 1000 parts per million by weight of the dicarboxylic acid anhydride.

Although the treating agents of the present invention produce outstanding results when employed in maleic anhydride, they may also be used in tetrahydrophthalic anhydride and hexahydrophthalic anhydride derived from maleic anhydride, as well as fumaric acid, succinic acid and maleic acid obtained from maleic anhydride.

Although this invention has been described with respect to various specific examples and embodiments, it is to be understood that this invention is not limited thereto and that it may be variously practiced within the scope of the following claims.

The embodiments of this invention in which an exclusive property or privilege is claimed are defined as follows:

1. A composition comprising a major amount of maleic anhydride and about 0.01 part per million to about 20,000 parts per million, based upon the weight of the dicarboxylic acid anhydride, of a treating agent represented by the structure

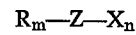

$$R_m-Z-X_n$$

where R is alkyl of from 1 to 8 carbon atoms or phenyl, Z is selected from the group consisting of aluminum, germanium, lead, mercury, phosphorus, selenium, silicon, tin, titanium and zirconium, X is a halogen, $m$ is an integer of from 1 to 4 and $n$ is an integer of from 1 to 3.

2. A composition of claim 1 wherein the treating agent comprises from about 0.05 to about 1000 parts per million by weight of the dicarboxylic acid anhydride.

3. A composition of claim 1 wherein Z is silicon.

4. A composition of claim 1 wherein Z is tin.

5. A composition of claim 1 wherein Z is germanium.

6. A composition of claim 2 wherein the treating agent is methyltrichlorosilane.

7. A composition of claim 2 wherein the treating agent is phenylthrichlorosilane.

8. A composition of claim 2 wherein the treating agent is dimethyldichlorosilane.

9. A composition of claim 2 wherein the treating agent is methyltin trichloride.

10. A composition of claim 2 wherein the treating agent is methylgermanium trichloride.

11. A composition of claim 1 wherein the treating agent is a mixture of two or more compounds represented by the structure of claim 1.

12. A method for improving the color stability of maleic anhydride which comprises incorporating in said anhydride from about 0.01 part per million to about 20,000 parts per million, based upon the weight of the dicarboxylic acid anhydride of a treating agent represented by the structure $$R_m\text{—}Z\text{—}X_n$$

wherein R is alkyl of from 1 to 8 carbon atoms or phenyl, Z is selected from the group consisting of aluminum, germanium, lead, mercury, phosphorus, selenium, silicon, tin, titanium and zirconium, X is a halogen, $m$ is an integer of from 1 to 4 and $n$ is an integer of from 1 to 3.

13. A method of claim 12 wherein Z is silicon.

14. A method of claim 12 wherein Z is tin.

15. A method of claim 12 wherein Z is germanium.

References Cited

UNITED STATES PATENTS 3,636,057   1/1972   Wehrman _____ 260—376.8

ALEX MAZEL, Primary Examiner

BERNARD DENTZ, Assistant Examiner